United States Patent
Douglas et al.

(10) Patent No.: US 12,419,211 B2
(45) Date of Patent: Sep. 23, 2025

(54) PLANT PROPAGATION MEDIUM AND METHODS OF MAKING AND USING IT

(71) Applicant: JS INVENTION FACTORY LLC, Bonita Springs, FL (US)

(72) Inventors: Joel Douglas, Bonita Springs, FL (US); Shem Lachhman, West Harrison, NY (US); Michael Curtis, Columbia, CT (US)

( * ) Notice: Subject to any disclaimer, the term of this patent is extended or adjusted under 35 U.S.C. 154(b) by 0 days.

(21) Appl. No.: 18/907,539

(22) Filed: Oct. 6, 2024

(65) Prior Publication Data

US 2025/0120333 A1 Apr. 17, 2025

Related U.S. Application Data

(60) Provisional application No. 63/544,347, filed on Oct. 16, 2023.

(51) Int. Cl.

| | |
|---|---|
| *A01C 7/00* | (2006.01) |
| *C05F 3/00* | (2006.01) |
| *C05F 17/00* | (2020.01) |
| *C05G 3/80* | (2020.01) |
| *C05G 5/00* | (2020.01) |

(52) U.S. Cl.
CPC ............... *A01C 7/004* (2013.01); *C05F 3/00* (2013.01); *C05F 17/00* (2013.01); *C05G 3/80* (2020.02); *C05G 5/45* (2020.02)

(58) Field of Classification Search
CPC . A01C 7/004; C05F 3/00; C05F 17/00; C05G 3/80; C05G 5/45
See application file for complete search history.

(56) References Cited

U.S. PATENT DOCUMENTS

| | | | |
|---|---|---|---|
| 4,692,494 A * | 9/1987 | Sonenstein | C08L 33/02 524/388 |
| 5,078,301 A * | 1/1992 | Gladfelter | C11D 7/14 222/52 |
| 10,066,165 B2 | 9/2018 | Donze | |

(Continued)

FOREIGN PATENT DOCUMENTS

| | | | | |
|---|---|---|---|---|
| CN | 108774373 A | * | 11/2018 | ............... C05D 3/00 |
| WO | WO-2020046623 A1 | * | 3/2020 | ............... C05G 5/45 |

*Primary Examiner* — Wayne A Langel
(74) *Attorney, Agent, or Firm* — Joel Douglas; Thomas Ciesco; Jeffrey Semprebon

(57) ABSTRACT

The present disclosure provides a hydroseeding substrate comprising primary solids from an anaerobic digester, a cover composition comprising bentonite clay and a water-dispersible polymer or starch, and a surface-treated hydroxypropyl methyl cellulose (HPMC). The primary solids may comprise fibrous solids from dairy, poultry, hog, or cattle waste. The water-dispersible polymer may include one or more cellulose derivatives. The surface-treated HPMC may be present in an amount of 0.1 to 20 weight percent of the substrate. The hydroseeding substrate may further include a fertilizer and a soil adjuvant. The disclosure also provides a method of producing a dissolvable fertilizer package and the resulting package, comprising a dried mixture of primary solids from an anaerobic digester and nutrients contained within a tube formed from a polyvinyl alcohol film that is 85-90% hydrolyzed.

8 Claims, 7 Drawing Sheets

(56) References Cited

U.S. PATENT DOCUMENTS

| | | | |
|---|---|---|---|
| 2008/0269053 A1* | 10/2008 | Less ........................ | C05F 1/005 |
| | | | 71/11 |
| 2009/0280983 A1* | 11/2009 | Picanco ................. | C05F 11/10 |
| | | | 504/116.1 |
| 2015/0059109 A1* | 3/2015 | Lv ............................ | A47L 1/02 |
| | | | 15/103 |
| 2015/0368166 A1* | 12/2015 | Callendrello ........... | C05C 11/00 |
| | | | 71/10 |
| 2017/0275212 A1* | 9/2017 | Forte ....................... | C05B 17/00 |
| 2025/0026693 A1* | 1/2025 | Hammond .............. | C05C 5/005 |

* cited by examiner

PLANT PROPAGATION MEDIUM AND METHODS OF MAKING AND USING IT

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

Trademarks used in the disclosure of the invention, and the applicants make no claim to any trademarks referenced.

CROSS-REFERENCE TO RELATED APPLICATIONS

"This application claims the benefit of U.S. Provisional Patent Application No. 63/544,347 filed on Oct. 16, 2023, which is incorporated by reference herein in its entirety.

BACKGROUND OF THE INVENTION

1) Field of the Invention

The present invention relates generally to a plant propagation medium, and to methods of making, applying, and using it.

In agricultural and horticultural applications, various materials are used to enhance soil quality, promote plant growth, and control erosion. Traditional products like peat moss and wood mulch have been widely employed for these purposes. However, concerns have arisen regarding the environmental impact and sustainability of harvesting these materials, particularly in the case of peat moss extraction from sensitive ecosystems.

The instant invention also relates to an agricultural and horticultural applications utilizing anaerobic digester byproducts, and more particularly to hydroseeding substrates and dissolvable fertilizer packages incorporating primary solids from anaerobic digesters as alternatives to traditional materials.

2) Description of Related Art

Anaerobic digestion has been utilized for waste treatment and energy production for many years. This process involves the breakdown of organic materials by microorganisms in the absence of oxygen, producing biogas and a nutrient-rich byproduct known as digestate. While the biogas can be used as a renewable energy source, the management and disposal of digestate has presented ongoing challenges.

Currently the state of the art includes the use of various materials to improve soil and plant growth materials. With the creation of large farms at the commercial level for raising domestic animals in large numbers such as cows, chickens, pigs, and cattle, has created an increased environmental concern over the animals' waste products produced by such a large domestic production of animals. The primary benefit of housing and feeding larger numbers of agricultural animals at a single site is that the consolidated operations give an economy of scale that lowers per unit product operating costs and improves profitability. However, as the number and size of concentrated, confined animal feeding operations have grown over the years, the development of technology to treat the waste material from these facilities has seriously lagged.

One method of utilizing manure is to use it as a fertilizer media. However, there are environmental concerns about direct application of raw manure to the ground, including rainwater runoff of pollutants into surface and ground waters, emissions of greenhouse gases to the atmosphere, and soil contamination, particularly for agricultural purposes, resulting from the large volume of waste. Therefore, utilization of animal manure has become a tremendous environmental problem throughout the world. One method to solve this problem is to use animal manure in a medium, as a method to promote plant propagation.

Hydroseeding is a planting technique that has gained popularity for its efficiency in establishing vegetation over large areas. This method typically involves spraying a slurry of seed, mulch, fertilizer, and other additives onto prepared ground. The composition of the hydroseeding mixture plays a crucial role in the success of plant establishment and erosion control.

In the realm of plant propagation and gardening, there is an ongoing need for effective growing media that can provide proper soil structure, water retention, and nutrient availability. Ideal media should also be renewable, lightweight, and free from contaminants that could harm plant growth or human health.

As environmental concerns continue to shape agricultural and horticultural practices, there is increasing interest in finding sustainable alternatives to traditional materials. This includes exploring ways to repurpose waste products and byproducts from various industries, potentially offering solutions that address multiple environmental challenges simultaneously.

The management of agricultural waste, particularly animal manure, presents its own set of challenges. While manure can be a valuable fertilizer, its direct application to soil can lead to issues such as nutrient runoff, odor problems, and pathogen transmission. Processing methods that can mitigate these risks while preserving the beneficial properties of manure are of significant interest to the agricultural community.

As the focus on sustainable practices intensifies, there is a growing need for innovative approaches that can effectively utilize waste products, reduce environmental impact, and provide valuable resources for plant growth and soil improvement. Such solutions have the potential to address multiple challenges in agriculture, horticulture, and waste management simultaneously.

These and other objects, features, and advantages of the present invention will become more readily apparent from the attached drawings and the detailed description of the preferred embodiments, which follow.

SUMMARY OF THE INVENTION

Bearing in mind the problems and deficiencies of the prior art, it is therefore an object of the present invention to provide a use for the resulting solids from anaerobic completely-mixed and plug flow digesters (hereinafter anaerobic digesters) used to convert animal waste to energy, these systems produce considerable useful byproducts and waste materials, and the focus of the invention is to provide a use for the materials to eliminate environmental damage due to disposal of the materials in traditional landfills or burning.

The anaerobic digestion of organic liquid and solid waste streams has been a fundamental part of waste treatment for hundreds of years. Municipal and industrial wastes have been treated utilizing anaerobic digestion techniques for over 100 years in the United States, and within the last thirty years, anaerobic digestion of higher strength animal wastes has also become an accepted practice. Although manure may be used to increase soil fertility, if it is used without any processing or aging, it has high levels of salts that may "burn" plants, smell unpleasant, contain high levels of pathogenic microorganisms, and decompose rapidly. Composts containing manure are effective uses of manure but are heavy and expensive due to extensive processing. One reason for this heaviness is the high moisture content, as even screw pressed manure has moisture content of 70% or greater. Additionally, composting will necessarily involve mixing manure solids with other soils such that the mixture will more readily decompose organics in the manure solids.

To effectively improve plant growth, media used for growing plants must have a number of important features. First, media should improve soil structure, water-holding capacity, and aeration. To do so, the media must be porous and well-drained, yet able to retain moisture to meet the water needs of plants between irrigations. Sphagnum peat moss is considered to be among the best planting medium components, because it retains water and improves soil porosity. Media for growing plants should also reduce salt content and improve ion exchange. Growing media must have a low salt content but a high ion exchange capacity to supply nutrients necessary for plant growth.

Plant media should have a distinct advantage of being renewable. Media such as peat moss is increasingly seen as non-renewable. It can take thousands of years for a bog to become peat moss. Mining peat moss has a large carbon footprint because of the vast quantities of greenhouse gases released with mining and the removal of 'stored carbon' in these lands as well as the harvesting, drying, and shipping it requires. In some years, peat moss has been in short supply because of vagaries of weather during the harvest season. Manure is, of course, available nearly everywhere.

Planting media should ideally be low in weight when dry. Generally, products for the retail market state that a bag contains dried manure or compost. However, these commercially available bags typically weigh 40 lb. per cubic foot and contain a great deal of water which is undesirable.

Commercially available manure products are generally not dust, weed, odor, and pathogen free. Almost all commercially available composts, dried manures and the like are not "clean hands" products, making them difficult to spread and use. Furthermore, commercially available mixes are generally heavy and are largely impermeable to gas exchange. The impermeability of gas exchange makes these mixes poorly suited to quality plant production.

In the prior art, a variety of treated manures are known. However, they are all only effective in accomplishing one or two of the aforementioned purposes, and no treated manure that can comprehensively answer all of the aforementioned purposes is known as yet.

According to an aspect of the present disclosure, a hydroseeding substrate is provided. The hydroseeding substrate includes primary solids from an anaerobic digester, a cover composition comprising bentonite clay and a water-dispersible polymer or starch, and a surface-treated hydroxypropyl methyl cellulose (HPMC).

According to other aspects of the present disclosure, the hydroseeding substrate may include one or more of the following features. The primary solids from the anaerobic digester may comprise fibrous solids from dairy, poultry, hog, or cattle waste. The water-dispersible polymer may comprise one or more of methylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose, and carboxymethyl cellulose. The surface-treated hydroxypropyl methyl cellulose (HPMC) may be present in an amount of 0.1 to 20 weight percent of the substrate. The surface-treated hydroxypropyl methyl cellulose (HPMC) may be present in an amount of 1 to 4 weight percent of the substrate. The hydroseeding substrate may further comprise a fertilizer. The hydroseeding substrate may further comprise a soil adjuvant.

According to another aspect of the present disclosure, a method of producing a dissolvable fertilizer package is provided. The method includes obtaining at least one digestate solid from an anaerobic digester, mixing the digestate solid with nutrients to form a uniformly mixed mixture, drying said mixture, placing said mixture in a polyvinyl alcohol film, wherein the polyvinyl alcohol film is 85-90% hydrolyzed, and sealing the ends of the polyvinyl alcohol film to create a tube.

According to other aspects of the present disclosure, the method may include one or more of the following features. The nutrients may comprise one or more of nitrogen, phosphorus, potassium, carbon, calcium, magnesium, sulfur, iron, manganese, copper, zinc, and boron. The method may further comprise forming the polyvinyl alcohol film into a tube prior to placing the mixture inside. The at least one digestate solid from the anaerobic digester may comprise fibrous or fine solids from dairy, poultry, hog, or cattle waste. The method may further comprise adding a pesticide to the mixture. The nutrients may comprise nitrogen, phosphorus, and potassium. The method may further comprise adding a soil adjuvant to the mixture.

According to another aspect of the present disclosure, a dissolvable fertilizer package is provided. The dissolvable fertilizer package includes a dried mixture of at least one digestate solid from an anaerobic digester and nutrients, and a tube formed from a polyvinyl alcohol film that is 85-90% hydrolyzed, wherein the dried mixture is contained within the tube.

According to other aspects of the present disclosure, the dissolvable fertilizer package may include one or more of the following features. The at least one digestate solid from the anaerobic digester comprise fibrous or fine solids from dairy, poultry, hog, or cattle waste. The nutrients may comprise one or more of nitrogen, phosphorus, potassium, carbon, calcium, magnesium, sulfur, iron, manganese, copper, zinc, and boron. The nutrients may comprise nitrogen, phosphorus, and potassium. The dissolvable fertilizer package may further comprise a pesticide mixed with the dried mixture. The dissolvable fertilizer package may further comprise a soil adjuvant mixed with the dried mixture.

In a preferred system for producing a hydroseeding mixture comprising:
  a. at least one digestate solid from an anaerobic digester and the at least one digestate has been dewatered in a dewatering step and the water collected in the dewatering step forming a liquid biproduct and the dewatered at least one digestate solid forms a dewatered solid;
  b. mixing the at least one digestate solid from the anaerobic digester with nutrients to form a uniformly mixed mixture;
  c. adding a water-based liquid to the mixture of nutrients and the at least one digestate solid from anaerobic digester thereby forming a hydroseeding mixture capable of being dispensed with hydroseeding equipment; and d. spraying the hydroseeding mixture onto a parcel of soil.

The preferred system for producing the hydroseeding mixture of the instant invention wherein the at least one primary solid is selected from the group consisting of fine digestate, course digestate, course and fine mixture of digestate.

The preferred system for producing the hydroseeding mixture of the instant invention wherein the course digestate range for said hydroseeding mixture is selected from 50% by volume of course digestate to 95% by volume of the course digestate and the fine digestate for hydroseeding the mixture is selected from 5% by volume of course digestate to 50% by volume of the fine digestate.

The preferred system for producing the hydroseeding mixture of the instant invention wherein the water-based liquid is selected from 0% by volume of liquid biproduct of the dewatering step to 15% by volume of the liquid biproduct of the dewatering step and the makeup water portion is selected from 85% of the water-based liquid to 100% of the water-based liquid.

The preferred system for producing the hydroseeding mixture of the instant invention wherein the nutrients are selected from the group consisting of nitrogen, phosphorus and potassium carbon, calcium, magnesium, sulfur, iron, manganese, copper, zinc boron, sulfur, iron, and pesticides.

The preferred system for producing the hydroseeding mixture of the instant invention wherein the hydroseeding equipment is selected from the group consisting of jet agitated hydro seeders and mechanical agitated hydro seeders.

In a first alternative method of producing a dissolvable fertilizer container and fertilizer comprising:
  e. at least one digestate solid from an anaerobic digester that has been dewatered in a dewatering step and the water collected in the dewatering step forming a liquid biproduct and the dewatered at least one digestate solid forms a dewatered solid;
  f. mixing the at least one digestate solid from the anaerobic digester with nutrients to form a uniformly mixed mixture;
  g. drying the mixture of at least one digestate solid from the anaerobic digester with nutrients;
  h. placing the mixture of at least one digestate solid from the anaerobic digester with nutrients in a polyvinyl alcohol film and the polyvinyl alcohol film is 85-90% hydrolyzed;
  i. sealing the ends of the polyvinyl alcohol film to create a tube with sealed ends.

The first alternative method for producing the dissolvable fertilizer container and fertilizer of the instant invention wherein the dewater solid is selected from the group consisting of dewatered fine digestate, course digestate, course and fine mixture of digestate.

The first alternative method for producing the dissolvable fertilizer container and fertilizer of the instant invention wherein the at least one primary solid is selected from the group consisting of fine digestate, course digestate, course and fine mixture of digestate.

In a first alternative preferred method for producing a dissolvable fertilizer container and fertilizer of the instant invention wherein the nutrient are selected from the group consisting of nitrogen, phosphorus and potassium carbon, calcium, magnesium, sulfur, iron, manganese, copper, zinc boron, sulfur, iron, and pesticides.

In a second alternative preferred hydroseeding substrate of the instant invention comprising:
  j. a primary solid consisting of at least one digestate solid from an anaerobic digester that has been dewatered in a dewatering step and the water collected in the dewatering step forming a liquid biproduct and the dewatered at least one digestate solid forms a dewater solid;
  k. a cover composition comprising bentonite clay and a water-dispersible polymer or starch;
  l. a surface-treated hydroxypropyl methyl cellulose (HPMC); and
  m. a water-based liquid comprising water and the liquid biproduct.

In a second alternative preferred hydroseeding substrate of the instant invention, wherein the primary solids from the anaerobic digester comprise animal and fibrous solids from dairy, poultry, hog, or cattle waste.

In a second alternative preferred hydroseeding substrate of the instant invention, wherein the water-dispersible polymer comprises one or more of methylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose, and carboxymethyl cellulose.

In a second alternative preferred hydroseeding substrate of the instant invention, wherein the surface-treated hydroxypropyl methyl cellulose (HPMC) is present in an amount of 0.1 to 20 weight percent of the substrate.

In a second alternative preferred hydroseeding substrate of the instant invention, wherein the surface-treated hydroxypropyl methyl cellulose (HPMC) is present in an amount of 1 to 4 weight percent of the substrate.

In a second alternative preferred hydroseeding substrate of the instant invention, further comprising a fertilizer.

In a second alternative preferred hydroseeding substrate of the instant invention, further comprising a soil adjuvant.

In a third alternative method of producing a dissolvable fertilizer package, comprising:
  a. obtaining at least one digestate solid from an anaerobic digester that has been dewatered in a dewatering step and the water collected in the dewatering step forming a liquid biproduct and the dewatered at least one digestate solid forms a dewater solid;
  b. mixing the at least one digestate solid with nutrients to form a uniformly mixed mixture;
  c. drying the mixture;
  d. placing the mixture in a polyvinyl alcohol film, wherein the polyvinyl alcohol film is 85-90% hydrolyzed; and
  e. sealing the ends and sides of the polyvinyl alcohol film to create a tube.

In a third alternative preferred method of the instant invention, wherein the nutrients comprise one or more of nitrogen, phosphorus, potassium, carbon, calcium, magnesium, sulfur, iron, manganese, copper, zinc, and boron.

In a third alternative preferred method of the instant invention, further comprising forming the polyvinyl alcohol film into a tube prior to placing the mixture inside.

The present invention is directed to overcoming the deficiencies in the art.

Still other objects and advantages of the invention will in part be obvious and will in part be apparent from the specification.

The above and other objects, which will be apparent to those skilled in the art, are achieved in the present invention which is directed to creating useful products from the solids output from anaerobic digesters.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
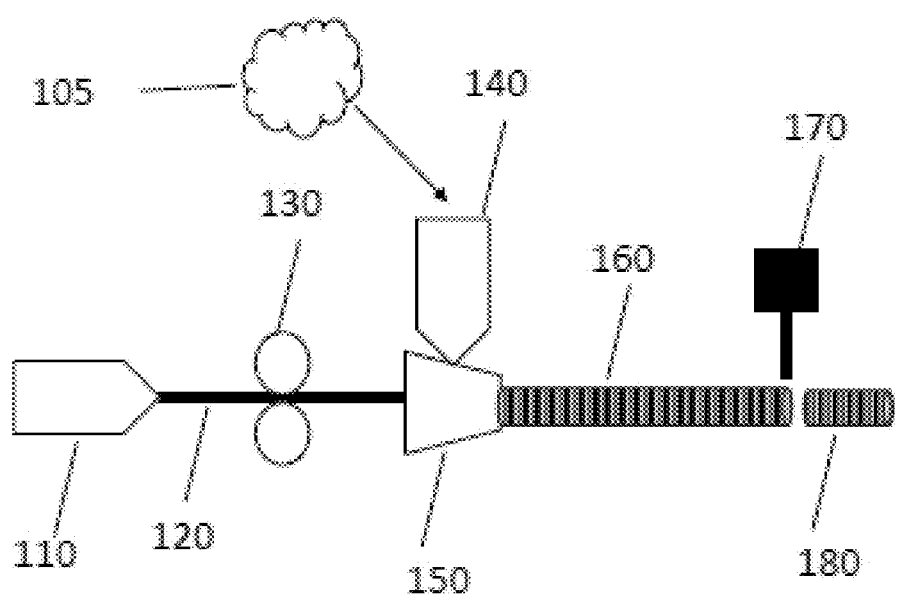
FIG. 1 is an elevation view of the instant invention showing an extrusion and fill process for making a dissolvable tube container.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth to provide a thorough understanding of the described embodiments. It will be apparent to one skilled in the art however that other embodiments of the present invention may be practiced without some of these specific details. Several embodiments are described herein, and while various features are ascribed to different embodiments, it should be appreciated that the features described with respect to one embodiment may be incorporated with other embodiments as well. For the same reason, however, no single feature or features of any described embodiment should be considered essential to every embodiment of the invention, as other embodiments of the invention may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As this invention is susceptible to embodiments of many different forms, it is intended that the present disclosure be considered as an example of the principles of the invention and not intended to limit the invention to the specific embodiments shown and described.

The terms solid waste byproducts and solids are used interchangeably within the specification and are intended to mean the resulting solids from anaerobic digestion.

The term byproducts consist of, but is not limited to, solids and liquids produced in the digestion process.

Fibrous solids, generally removed with screw press or other operations, are referred to as primary solids.

The term hydroseeding materials as used in the specification is meant to mean materials used in the formulation of hydroseeding compositions. These can comprise of primary solids and other materials that are suitable for use in a hydroseeding mixture.

The terms agricultural and horticultural applications are used interchangeably in the specification and are meant to mean any growing process.

The term digestate solids as used in this disclosure is a product of anaerobic digestion called digestate. Digestate is a wet mixture of solid and liquid materials that are left over after microorganisms break down biodegradable waste in the absence of oxygen. The microbes in the digesters cannot use the solid remnants of the original input material, so they remain as digestate.

The term at least one digestate solid as used in this disclosure is meant to mean a fiber digestate product of anaerobic digestion and may contain either or fine or course solids or a combination of fine or course solids.

The term seeds as used in the specification is meant to mean any type of seed but preferably a grass seed.

Digestate solids or primary solids are extracted from digestate using a course or fine particle separator to remove the entrapped water, and the results are a fiber digestate.

Primary solids can be further treated to extract fine solids which contain high levels of nutrients. These solids are referred to as secondary solids.

The digestate solids are dewatered in a dewatering step which is a process that removes water from digestate to concentrate it and reduce its volume. Dewatering can be done using low pressure evaporation, hydrothermal processes, mechanical methods or membrane technology.

The mechanical methods of dewatering can include but are not limited to screw press, Multi-Disk Screw Press MDQ, Multi-Roller Disk Press JD, Multi-Disk Sludge Thickener Esmil MDQ-T, Containerized sludge dewatering systems Esmil Module-D, screen dewatering machines and Membrane-based filtrate treatment systems.

Prior to a discussion of the preferred embodiment of the invention, it should be understood that while the features and advantages of the invention are illustrated in terms of an hydroseeding, or soil conditioning materials that other hydroseeding or soil conditioning compositions can be made from the output of anaerobic digesters.

The present disclosure relates to innovative applications of primary solids from anaerobic digesters in the field of agriculture and horticulture. In one aspect, the disclosure provides a hydroseeding substrate that incorporates these primary solids as a replacement for traditional wood mulch. This substrate may offer enhanced nutrient content and erosion control, potentially improving the efficiency of hydroseeding applications and promoting healthier plant growth. In another aspect, the disclosure provides a dissolvable fertilizer package that contains a dried mixture of primary solids from anaerobic digesters and nutrients, enclosed in a tube formed from a polyvinyl alcohol film. This package may serve as an environmentally friendly alternative to peat moss for planting applications, releasing the nutrient-rich mixture into the soil upon exposure to water. Both aspects of the disclosure present potential solutions for the efficient use of anaerobic digester byproducts, addressing environmental concerns associated with traditional materials and offering improved plant growth promotion and soil conditioning properties.

In some aspects, the hydroseeding substrate may comprise primary solids from an anaerobic digester. These primary solids may be derived from the anaerobic digestion of organic waste streams, such as dairy, poultry, hog, or cattle waste. The primary solids may serve as a replacement for traditional wood mulch in the hydroseeding substrate, potentially offering enhanced nutrient content and erosion control. The substrate may also comprise a cover composition, which may include bentonite clay and a water-dispersible polymer or starch. In some cases, the water-dispersible polymer may be selected from a group consisting of methylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose, and carboxymethyl cellulose. In certain embodiments, the hydroseeding substrate may further comprise a surface-treated hydroxypropyl methyl cellulose (HPMC), which may be present in an amount of 0.1 to 20 weight percent of the substrate.

In another aspect, the disclosure provides a dissolvable fertilizer package. This package may comprise a dried mixture of at least one digestate solid from an anaerobic digester and nutrients. The primary solid may be derived from the anaerobic digestion of organic waste streams, such as dairy, poultry, hog, or cattle waste. The nutrients may include one or more of nitrogen, phosphorus, potassium, carbon, calcium, magnesium, sulfur, iron, manganese, copper, zinc, and boron. The dried mixture may be contained within a tube formed from a polyvinyl alcohol film that is 85-90% hydrolyzed. Upon exposure to water, the polyvinyl alcohol film may dissolve, releasing the nutrient-rich mixture into the soil.

In some cases, the primary solids from anaerobic digesters may be used as a total or partial replacement for peat moss in agriculture and horticultural potting. Peat moss, while traditionally used for its water retention and soil porosity improvement properties, has been associated with environmental concerns due to its non-renewable nature and the greenhouse gases released during its mining. The primary solids from anaerobic digesters, on the other hand, may offer similar or even superior plant growth promotion and soil conditioning properties, while being derived from a renewable source and potentially reducing the environmental impact.

In some aspects, the hydroseeding substrate may comprise a cover composition. This cover composition may include bentonite clay and a water-dispersible polymer or starch. Bentonite clay, a type of absorbent clay, may contribute to the water-holding capacity of the substrate, potentially enhancing its ability to retain moisture and meet the water needs of plants between irrigations. The water-dispersible polymer or starch may serve to improve the structure and porosity of the substrate, potentially enhancing its ability to facilitate gas exchange and promote plant growth. In some cases, the water-dispersible polymer may be selected from a group consisting of methylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose, and carboxymethyl cellulose. These polymers may offer desirable properties such as water solubility, biodegradability, and non-toxicity, potentially making them suitable for use in the hydroseeding substrate.

In certain embodiments, the hydroseeding substrate may further comprise a surface-treated hydroxypropyl methyl cellulose (HPMC). This surface-treated HPMC may be chemically surface-treated to achieve improved dispersibility in water, potentially enhancing the homogeneity of its dispersal in the hydroseeding slurry. The surface-treated HPMC may be present in an amount of 0.1 to 20 weight percent of the substrate, depending on the desired properties of the substrate. In some cases, the surface-treated HPMC may be present in an amount of 1 to 4 weight percent of the substrate. The inclusion of surface-treated HPMC in the substrate may strengthen the affinity between the primary solids from the anaerobic digesters and the bentonite clay, potentially improving erosion protection and reducing turbidity in run-off water.

The hydroseeding substrate may be infused with seeds for the process of propagating and growing grasses for landscaping.

Further, the invention relates in general to the field of digester solid waste output, and more particularly, to a plant propagation medium, the improvement comprising solid waste byproduct from anaerobic digestion process and the byproduct having a moisture content of 2 to 60 wt. %. Also disclosed is a method of manufacturing a digester soil waste product and the solid waste product itself.

In some cases, the hydroseeding substrate may include fiber in addition to the digestate solids from anaerobic digesters. This fiber may serve to enhance the structure and porosity of the substrate, potentially improving its ability to facilitate gas exchange and promote plant growth. The fiber may be derived from various sources, such as plant materials or synthetic materials, depending on the desired properties of the substrate. The inclusion of fiber in the substrate may offer additional benefits, such as improving the substrate's resistance to erosion and enhancing its ability to retain moisture.

In some aspects, the digestate solids from anaerobic digesters may be derived from various sources of organic waste. These sources may include, but are not limited to, dairy, poultry, hog, or cattle waste. The anaerobic digestion of these waste streams may result in the production of fibrous solids, which may serve as a key component of the hydroseeding substrate or the dissolvable fertilizer package. These fibrous solids may offer a range of beneficial properties, such as high nutrient content, water retention capacity, and soil conditioning capabilities, potentially enhancing the growth and health of plants.

In some cases, the fibrous solids from dairy waste may be used in the hydroseeding substrate or the dissolvable fertilizer package. Dairy waste, which may include manure and other waste products from dairy farming operations, may undergo anaerobic digestion to produce fibrous solids with high nutrient content. These solids may serve as a rich source of organic matter, potentially improving soil fertility and promoting plant growth.

In other cases, the digestate solids from anaerobic digesters may be derived from poultry waste. Poultry waste, which may include manure and other waste products from poultry farming operations, may be processed through anaerobic digestion to produce fine solids. These solids may offer a range of beneficial properties, such as high nutrient content and water retention capacity, potentially enhancing the growth and health of plants.

In yet other cases, the digestate solids from anaerobic digesters may be derived from hog waste. Hog waste, which may include manure and other waste products from hog farming operations, may undergo anaerobic digestion to produce fibrous solids. These solids may serve as a rich source of organic matter, potentially improving soil fertility and promoting plant growth.

In still other cases, the digestate solids from anaerobic digesters may be derived from cattle waste. Cattle waste, which may include manure and other waste products from cattle farming operations, may be processed through anaerobic digestion to produce fibrous solids. These solids may offer a range of beneficial properties, such as high nutrient content and water retention capacity, potentially enhancing the growth and health of plants.

In each of these cases, the fibrous solids from the anaerobic digestion of dairy, poultry, hog, or cattle waste may serve as a key component of the hydroseeding substrate and the fine solids from the anaerobic digestion may serve as a key component of the dissolvable fertilizer package. These solids may offer a range of beneficial properties, potentially enhancing the growth and health of plants and offering an efficient and environmentally friendly alternative to traditional materials such as wood mulch and peat moss.

In some aspects, the cover composition of the hydroseeding substrate may include bentonite clay. Bentonite clay, a type of absorbent clay, may contribute to the water-holding capacity of the substrate, potentially enhancing its ability to retain moisture and meet the water needs of plants between irrigations. The bentonite clay may also serve to improve the structure and porosity of the substrate, potentially enhancing its ability to facilitate gas exchange and promote plant growth.

In addition to bentonite clay, the cover composition may also include a water-dispersible polymer or starch. The water-dispersible polymer or starch may serve to improve the structure and porosity of the substrate, potentially enhancing its ability to facilitate gas exchange and promote plant growth. In some cases, the water-dispersible polymer may be selected from a group consisting of methylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose, and carboxymethyl cellulose. These polymers may offer desirable properties such as water solubility, biodegradability, and non-toxicity, potentially making them suitable for use in the hydroseeding substrate.

In certain embodiments, the water-dispersible polymer may be methylcellulose. Methylcellulose, a cellulose derivative with hydrophilic properties, may offer excellent water retention capabilities, potentially enhancing the moisture-holding capacity of the substrate. In other embodiments, the water-dispersible polymer may be ethyl methyl cellulose, hydroxyethyl cellulose, hydroxypropyl cellulose, hydroxyethyl methyl cellulose, hydroxypropyl methyl cellulose, ethyl hydroxyethyl cellulose, or carboxymethyl cellulose. Each of these polymers may offer unique properties that may enhance the performance of the hydroseeding substrate in different ways, such as improving water retention, enhancing soil structure, or promoting plant growth.

In some aspects, the hydroseeding substrate may include a surface-treated hydroxypropyl methyl cellulose (HPMC). This surface-treated HPMC may be chemically surface-treated to achieve improved dispersibility in water, potentially enhancing the homogeneity of its dispersal in the hydroseeding slurry. The surface-treated HPMC may be present in an amount of 0.1 to 20 weight percent of the substrate, depending on the desired properties of the substrate. In some cases, the surface-treated HPMC may be present in an amount of 1 to 4 weight percent of the substrate. The inclusion of surface-treated HPMC in the substrate may strengthen the affinity between the primary solids from the anaerobic digesters and the bentonite clay, potentially improving erosion protection and reducing turbidity in run-off water.

In certain embodiments, the surface-treated HPMC may be chemically surface-treated with a compound such as glyoxal. This chemical surface treatment may enhance the water dispersibility of the HPMC, potentially improving the consistency and homogeneity of the hydroseeding slurry. The surface-treated HPMC may also strengthen the bond between the primary solids from the anaerobic digesters and the bentonite clay, potentially enhancing the erosion resistance of the substrate and reducing the turbidity of run-off water.

In some cases, the surface-treated HPMC may be included in the hydroseeding substrate in varying amounts, depending on the desired properties of the substrate. For instance, in some embodiments, the surface-treated HPMC may be present in an amount of 0.1 to 20 weight percent of the substrate. This range may allow for flexibility in adjusting the properties of the substrate, such as its water retention capacity, erosion resistance, and nutrient content. In other embodiments, the surface-treated HPMC may be present in an amount of 1 to 4 weight percent of the substrate. This range may provide a balance between the benefits of the surface-treated HPMC, such as improved water dispersibility and enhanced erosion resistance, and the cost and availability of the material.

In some aspects, the hydroseeding substrate may further comprise a fertilizer. The inclusion of a fertilizer in the substrate may provide additional nutrients necessary for plant growth. The type and amount of fertilizer used may vary depending on the specific needs of the plants to be grown. For instance, the fertilizer may include nutrients such as nitrogen, phosphorus, and potassium, which are essential for plant growth. The fertilizer may be mixed with the primary solids from the anaerobic digester and the cover composition to form a uniformly mixed hydroseeding substrate.

In some cases, the hydroseeding substrate may also comprise a soil adjuvant. Soil adjuvants are additives that may aid in the growth of the desired vegetation. These adjuvants may include, but are not limited to, additives which may adjust the pH of the growing medium, additional fertilizers, or other nutrients. Additional adjuvants that may be added to change the viscosity or strength of the slurry, or to improve resistance to rain before cure, include cellulosic polymers, additional fibers, or cement. The inclusion of a soil adjuvant in the hydroseeding substrate may enhance the growth and production of a root system, potentially improving the overall health and vitality of the plants.

In some aspects, a method may be employed to produce a dissolvable fertilizer package. This method may involve obtaining digestate solids from an anaerobic digester. The digestate solid may be derived from the anaerobic digestion of organic waste streams, such as dairy, poultry, hog, or cattle waste. The digestate solid may serve as a key component of the fertilizer package, potentially offering high nutrient content and soil conditioning capabilities.

The method may further involve mixing the at least one digestate solids with nutrients to form a uniformly mixed mixture. The nutrients may include one or more of nitrogen, phosphorus, potassium, carbon, calcium, magnesium, sulfur, iron, manganese, copper, zinc, and boron. These nutrients may serve to enhance the growth and health of plants, potentially improving soil fertility and promoting plant growth.

Following the mixing step, the mixture may be dried. The drying process may serve to reduce the moisture content of the mixture, potentially enhancing its shelf life and ease of handling. The dried mixture may offer a range of beneficial properties, such as high nutrient content and water retention capacity, potentially enhancing the growth and health of plants.

The dewatering step is a process that removes water from digestate to concentrate it and reduce its volume. Dewatering can be done using low pressure evaporation, Hydrothermal processes, mechanical methods or membrane technology.

The mechanical methods of dewatering can include but are not limited to screw press, Multi-Disk Screw Press MDQ, Multi-Roller Disk Press JD, Multi-Disk Sludge Thickener Esmil MDQ-T, Containerized sludge dewatering systems Esmil Module-D, Membrane-based filtrate treatment systems.

The dried mixture may then be placed in a polyvinyl alcohol film. The polyvinyl alcohol film may be 85-90% hydrolyzed, offering desirable properties such as water solubility and biodegradability. The film may serve as a container for the dried mixture, potentially facilitating its storage, transport, and application.

Finally, the ends of the polyvinyl alcohol film may be sealed to create a tube. The sealing process may serve to enclose the dried mixture within the tube, potentially preventing leakage or contamination. The resulting tube may serve as a dissolvable fertilizer package, which may be easily applied to the soil by placing it in a planting hole and exposing it to water. Upon exposure to water, the polyvinyl alcohol film may dissolve, releasing the nutrient-rich mixture into the soil.

In some cases, the polyvinyl alcohol film may be formed into a tube prior to placing the mixture inside. This may facilitate the packaging process, potentially enhancing the efficiency and ease of producing the dissolvable fertilizer package. The tube may be of any suitable size, depending on the desired application and the amount of dried mixture to be contained.

In other cases, the method may further involve adding a pesticide to the mixture. The pesticide may serve to protect the plants from pests, potentially enhancing the health and vitality of the plants. The pesticide may be mixed with the primary solid and the nutrients to form a uniformly mixed mixture, potentially ensuring even distribution throughout the dissolvable fertilizer package.

In some aspects, the nutrients mixed with the primary solids from the anaerobic digester to form the dissolvable fertilizer package may comprise one or more of nitrogen, phosphorus, potassium, carbon, calcium, magnesium, sulfur, iron, manganese, copper, zinc, and boron. These nutrients may serve to enhance the growth and health of plants, potentially improving soil fertility and promoting plant growth. Nitrogen, phosphorus, and potassium, often referred to as NPK, are primary macronutrients that are crucial for plant growth. Nitrogen is essential for the growth of leaves and stems, phosphorus is important for root development and flowering, and potassium aids in overall plant health and disease resistance.

In addition to these primary macronutrients, the nutrients may also include secondary macronutrients and micronutrients. Secondary macronutrients such as calcium, magnesium, and sulfur are also essential for plant growth, albeit in smaller quantities than the primary macronutrients. Calcium may contribute to the strength and structure of plant cell walls, magnesium is a component of chlorophyll and aids in photosynthesis, and sulfur is essential in the production of proteins and enzymes.

Micronutrients, including iron, manganese, copper, zinc, and boron, are required by plants in trace amounts but are nonetheless vital for various plant functions. For instance, iron is necessary for chlorophyll synthesis, manganese aids in photosynthesis and nitrogen metabolism, copper is involved in photosynthesis and reproductive processes, zinc plays a role in enzyme function and protein synthesis, and boron is important for cell division and sugar transport.

In some cases, the nutrients may be mixed with the primary solids from the anaerobic digester in specific ratios to create a balanced fertilizer that meets the nutritional needs of the plants. The specific ratios may vary depending on the type of plants to be grown, the condition of the soil, and other factors. The resulting mixture may provide a comprehensive nutrient solution for plants, potentially enhancing their growth and health.

In some aspects, the dissolvable fertilizer package may be formed from a polyvinyl alcohol film that is 85-90% hydrolyzed. Polyvinyl alcohol (PVA) is a polymer known for its excellent film forming, emulsifying, and adhesive properties. The hydrolysis level of the PVA film may affect its water solubility and biodegradability. In the case of the dissolvable fertilizer package, a PVA film that is 85-90% hydrolyzed may be used. This level of hydrolysis may provide a balance between water solubility and mechanical strength, potentially making the film suitable for containing the dried mixture of primary solids from the anaerobic digester and nutrients. PVA is designed to dissolve completely in water and biodegrade in wastewater treatment plants. polyvinyl alcohol, also known as PVOH or PVA. The instant invention envisions using PVA sheets from MonoSol.

The PVA film may serve as a container for the dried mixture, potentially facilitating its storage, transport, and application. Upon exposure to water, such as during irrigation or rainfall, the PVA film may dissolve, releasing the nutrient-rich mixture into the soil. This dissolution process may eliminate the need for manual removal of the package, potentially simplifying the application process and reducing waste. Furthermore, as the PVA film dissolves, it may not leave any harmful residues in the soil, potentially making it an environmentally friendly packaging option.

In some cases, the PVA film may be formed into a tube prior to placing the dried mixture inside. This tube formation process may involve extruding the PVA film into a tubular shape, potentially providing a convenient and efficient method for packaging the dried mixture. The tube may be of any suitable size, depending on the desired application and the amount of dried mixture to be contained.

In other cases, the dried mixture may be placed in the PVA film, and then the ends of the film may be sealed to create a tube. This sealing process may involve applying heat or pressure to the ends of the film, potentially creating a secure closure that prevents leakage or contamination of the dried mixture. The resulting tube may serve as a dissolvable fertilizer package, which may be easily applied to the soil by placing it in a planting hole and exposing it to water.

In certain embodiments, the PVA film may be 85-90% hydrolyzed. This level of hydrolysis may provide a balance between water solubility and mechanical strength, potentially making the film suitable for containing the dried mixture of primary solids from the anaerobic digester and nutrients. The PVA film may serve as a container for the dried mixture, potentially facilitating its storage, transport, and application. Upon exposure to water, such as during irrigation or rainfall, the PVA film may dissolve, releasing the nutrient-rich mixture into the soil. This dissolution process may eliminate the need for manual removal of the package, potentially simplifying the application process and reducing waste. Furthermore, as the PVA film dissolves, it may not leave any harmful residues in the soil, potentially making it an environmentally friendly packaging option.

In some aspects, the method of producing the dissolvable fertilizer package may further involve adding a pesticide to the mixture. The pesticide may serve to protect the plants from pests, potentially enhancing the health and vitality of the plants. The pesticide may be mixed with the primary solid and the nutrients to form a uniformly mixed mixture, potentially ensuring even distribution throughout the dissolvable fertilizer package. The type and amount of pesticide used may vary depending on the specific needs of the plants to be grown and the pest conditions in the area of application.

In other aspects, the method may also involve adding a soil adjuvant to the mixture. Soil adjuvants are additives that may aid in the growth of the desired vegetation. These adjuvants may include, but are not limited to, additives which may adjust the pH of the growing medium, additional fertilizers, or other nutrients. Additional adjuvants that may be added to change the viscosity or strength of the slurry, or to improve resistance to rain before cure, include cellulosic polymers, additional fibers, or cement. The inclusion of a soil adjuvant in the mixture may enhance the growth and production of a root system, potentially improving the overall health and vitality of the plants.

In some embodiments, the dissolvable fertilizer package may comprise a dried mixture of at least one digestate solid from an anaerobic digester and the at least one digestate has been dewatered, nutrients, and a pesticide. The pesticide may be mixed with the primary solid and the nutrients to form a uniformly mixed mixture. Upon exposure to water, the pesticide may be released along with the nutrient-rich mixture into the soil, potentially providing protection against pests and promoting healthier plant growth.

In other embodiments, the dissolvable fertilizer package may comprise a dried mixture of at least one digestate solid from an anaerobic digester and the at least one digestate has been dewatered, nutrients, and a soil adjuvant. The soil adjuvant may be mixed with the primary solid and the nutrients to form a uniformly mixed mixture. Upon exposure to water, the soil adjuvant may be released along with the nutrient-rich mixture into the soil, potentially enhancing the growth and production of a root system and improving the overall health and vitality of the plants.

In some aspects, the polyvinyl alcohol film may be formed into a tube prior to placing the mixture inside. This tube formation process may involve extruding the polyvinyl alcohol film into a tubular shape, potentially providing a convenient and efficient method for packaging the dried mixture. The tube may be of any suitable size, depending on the desired application and the amount of dried mixture to be contained. Once the tube is formed, the dried mixture of primary solids from the anaerobic digester and nutrients may be placed inside the tube. The ends of the tube may then be sealed, potentially creating a secure closure that prevents leakage or contamination of the dried mixture. The resulting tube may serve as a dissolvable fertilizer package, which may be easily applied to the soil by placing it in a planting hole and exposing it to water.

In other cases, the dissolvable fertilizer package may comprise separate containers for different materials and chemicals, bonded together to form a single deployable container. Each container may be formed from a polyvinyl alcohol film and may contain a specific type of material or chemical, such as a primary solid from an anaerobic digester, a nutrient, or a pesticide. The separate containers may be bonded together using a suitable bonding method, such as adhesive bonding, heat sealing, or ultrasonic welding. This configuration may allow for the separate storage and controlled release of different materials and chemicals, potentially enhancing the effectiveness of the dissolvable fertilizer package. Upon exposure to water, each container may dissolve independently, releasing its contents into the soil at a specific rate or time, potentially providing a controlled and targeted delivery of nutrients and other beneficial substances to the plants.

In some aspects, the hydroseeding substrate may be mixed with water to form a hydroseeding slurry for application. The amount of water added to the substrate may be adjusted to accommodate the specific needs of the application. For instance, in some cases, between 70 and 100 gallons of water may be added per 50 pounds of hydroseeding substrate. This range may allow for flexibility in adjusting the consistency of the slurry, potentially enhancing its application properties and effectiveness in promoting plant growth.

In certain embodiments, the hydroseeding slurry may have a pudding-like consistency. This consistency may be achieved by adjusting the amount of water added to the hydroseeding substrate, as well as the proportions of the primary solids from the anaerobic digester, the cover composition, and any additional components such as a surface-treated hydroxypropyl methyl cellulose (HPMC) or a fertilizer. A pudding-like consistency may offer several advantages, such as preventing the clogging of hydroseeding machinery and equipment, lubricating the hoses and pumps used in the application process, and ensuring a quicker, easier application process. Furthermore, the pudding-like consistency of the hydroseeding slurry may enhance its adherence to the soil surface, potentially improving its erosion resistance and nutrient delivery capabilities.

In some cases, the dissolvable fertilizer package may be used in agricultural and horticultural applications as a replacement for traditional materials such as peat moss. The package may be placed in a planting hole, and upon exposure to water, the polyvinyl alcohol film may dissolve, releasing the nutrient-rich mixture into the soil. This process may eliminate the need for manual removal of the package, potentially simplifying the application process and reducing waste. Furthermore, as the polyvinyl alcohol film dissolves, it may not leave any harmful residues in the soil, potentially making it an environmentally friendly alternative to traditional materials. The nutrient-rich mixture released from the dissolvable fertilizer package may provide a comprehensive nutrient solution for plants, potentially enhancing their growth and health.

In some aspects, the hydroseeding substrate may be prepared by mechanically mixing the primary solids from the anaerobic digester, the cover composition, and the surface-treated hydroxypropyl methyl cellulose (HPMC). This mixing process may involve the use of a mechanical mixer, such as a paddle mixer, a ribbon blender, or a drum mixer. The mechanical mixer may serve to thoroughly combine the components of the substrate, potentially ensuring a uniform distribution of the primary solids, the cover composition, and the surface-treated HPMC throughout the substrate. The resulting hydroseeding substrate may offer a consistent nutrient content and erosion control capability, potentially enhancing its effectiveness in promoting plant growth and soil conditioning.

In some cases, the hydroseeding substrate may be provided in bulk or packaged in the form of unit packages. These unit packages may be of any suitable size, depending on the specific needs of the application. For instance, in some embodiments, the unit packages may weigh 50 or 100 pounds. This range may allow for flexibility in adjusting the quantity of substrate used in each application, potentially enhancing the efficiency and convenience of the hydroseeding process. The unit packages may be sealed to prevent contamination or leakage of the substrate, potentially ensuring its quality and shelf life.

In other aspects, the dissolvable fertilizer package may be used in a variety of agricultural and horticultural applications. For instance, the package may be used as a soil conditioner, a nutrient supplement, or a planting medium. The package may be placed in a planting hole, and upon exposure to water, the polyvinyl alcohol film may dissolve, releasing the nutrient-rich mixture into the soil. This process may eliminate the need for manual removal of the package, potentially simplifying the application process and reducing waste. Furthermore, as the polyvinyl alcohol film dissolves, it may not leave any harmful residues in the soil, potentially making it an environmentally friendly alternative to traditional materials. The nutrient-rich mixture released from the dissolvable fertilizer package may provide a comprehensive nutrient solution for plants, potentially enhancing their growth and health.

Furthermore, one aspect of the present invention is directed to a plant propagation medium formed from fibrous anaerobic dairy, poultry, hog, and cattle digester (hereinafter anaerobic digester) primary output solids. The present invention is directed towards use of the solids from anaerobic digesters as a total or partial replacement of peat moss in agriculture and horticultural potting. The primary solids from anaerobic digesters of the present invention have exceptional abilities to provide nutrition and soil conditioning properties to agricultural and horticultural applications as well as a variety of other advantages, such as drought and soil resistance, to plants grown in the mixes. The processes and source materials used in the present invention overcome many of the deficiencies normally associated with the use of peat moss and mulch currently used in horticultural mixes. The present invention also discloses efficient and novel products and related manufactured articles containing solids that are outputted from anaerobic digesters and other agricultural wastes for plant growth, hydroseeding mixtures and instant sod. The products manufactured by the present invention are made in large part or entirely with organic dried solids that result from anaerobic digesters processes and have a near optimal moisture content for long shelf life.

The first application of primary solids from anaerobic digesters includes replacing the traditional mulch used in hydroseeding and replacing this mulch with primary solids from anaerobic digesters. Currently, hydroseeding is a convenient, cost-effective way to plant grass seed. Hydroseeding is more efficient than traditional seeding and more affordable than laying sod, hydroseeding strikes a fine balance. Although the name sounds high-tech, hydroseeding can be done DIY-style or by a professional lawn care. Hydroseeding is a technique that spreads a specialized grass "slurry" evenly over bare ground to grow grass and prevent soil erosion. This slurry typically consists of grass seeds, mulch, water, fertilizer, biostimulants, nutrients, bentonite clay, and a water-dispersible polymer and/or starch, cover composition, growth promoting chemicals, and occasionally green-tinted dye. The cover composition includes bentonite clay and cellulosic water dispersible polymer or starch. In some embodiments, the hydroseeding substrate includes 1-5 parts by weight of mulch. The instant invention replaces the mulch with the primary solids from anaerobic digesters. This modification to the basing formulation creates a medium that is higher in nutrients than traditional wood mulch formulations.

The mixture helps the seeds germinate and take root. The fertilizer boosts growth, the mulch bonds the seeds to the soil, protects them from the elements (like wind or too much sunlight), and adds extra nutrients by decomposing on the growing grass. Ultimate nutrient release depends upon decomposition of the primary solids, so the process is inherently 'slow release'. The chemicals and other nutrients are formulated to enhance the grass growth and production of a root system.

Hydroseeding is also called hydromulching and hydraulic mulch seeding. If you have not heard of hydroseeding or any of its other monikers before, it may sound a bit mysterious. It is a proven process that has existed for more than a half-century.

Replacing the mulch component of the hydroseeding mixture with the primary solids from anaerobic digesters solves three significant problems. The first is the creation of mulch from wood fiber which is expensive and consumes significant energy and labor resources to produce. The second is that the nutrient load of the primary solids from anaerobic digesters is greater than the nutrient contained in wood mulch and therefore the grass receives a higher loading of nutrients that promotes growth. The third is the enhanced erosion control afforded with primary solids use. Materials are denser resulting from high water absorptive characteristics and resultantly less likely to erode with rainfall.

The cover composition includes cellulosic water dispersible polymer or starch. In some embodiments, the cover composition includes about 0.5 to about 25 weight percent cellulosic water dispersible polymer or starch. In other embodiments, the cover composition includes about 0.5 to 5 weight percent cellulosic water dispersible polymer. All water-dispersible cellulosic polymers are envisioned, but those that are cold-water dispersible (i.e., under 40° C.) are preferred. Suitable polymers include one or more of methylcellulose, ethyl methyl cellulose, hydroxyethyl cellulose (HEC), hydroxypropyl cellulose, hydroxyethyl methyl cellulose, hydroxypropyl methyl cellulose (HPMC), ethyl hydroxyethyl cellulose and carboxymethyl cellulose. In certain embodiments, the cellulosic water dispersible polymer is hydroxypropyl methyl cellulose. In other embodiments, the water dispersible polymer or starch comprises pregelatinized wheat starch. As an adhesive agent in place of—or in addition to—the cellulosic polymer, one may include wheat starch, for instance, pregelatinized wheat starch.

In some embodiments, the hydroseeding substrate additionally comprises 0.1 to 20 weight percent of surface-treated hydroxypropyl methyl cellulose (HPMC). Surface-treated HPMC is known in the art and differs from HPMC (untreated) in that it has been chemically surface-treated (for example, non-limiting embodiments of surface-treated HPMC include those where HPMC has been surface-treated with, e.g., glyoxal) so as to achieve improved dispersibility in water. Thus, for example, while untreated HPMC is water dispersible, it is preferable that untreated HPMC first be mixed with dry material in order to maximize the homogeneity of its dispersal in an aqueous system. Surface-treated HPMC, on the other hand, achieves good dispersibility even when added directly to aqueous systems by itself.

Inclusion of the surface treated HPMC in embodiments of the inventive products and methods is believed to strengthen affinity between the mulch and bentonite clay, thereby improving erosion protection and reduction of turbidity in run-off water.

In some embodiments, the hydroseeding substrate comprises 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 wt. % surface-treated HPMC, including any and all ranges and subranges therein (e.g., 0.1-18 wt. %, 0.75-5 wt. %, 1-4 wt. %, 1.5-3 wt. %, etc.).

Mixing of the hydroseeding substrate may be accomplished in any convenient fashion. For instance, the hydroseeding substrate can be prepared by mechanically mixing the bentonite and, if not already present, the water-dispersible polymer. In one aspect the cover composition (that is, the dry powder) is mixed with the mulch to form the hydroseeding substrate. The hydroseeding substrate may then be provided in bulk or packaged in the form of unit packages. While these unit packages may be of any size, a weight of 50 or 100 pounds may be desirable.

Table I shows representative examples of the constituents of a 50-pound bag of the hydroseeding substrate. In these examples, the cover composition is PSM-200™ setting agent provided by Landfill Service Corporation. PSM 200® is an exclusive blend of finely powdered volcanic rock, tackifiers and solidifiers, which serve to promote the adhesion of the slurry to extreme slopes.

TABLE I

Hydroseeding Substrate Examples (50 lb. Bag) all amounts in pounds

| | Example # | | | | | |
|---|---|---|---|---|---|---|
| | 1 | 2 | 3 | 4 | 5 | 6 |
| Solids (lbs.) from digester | 25 | 23.5 | 26.5 | 27.25 | 26.5 | 26.75 |
| Cover Composition (lbs.) Optionally from digester | 25 | 23.5 | 22.0 | 22.75 | 22 | 22.25 |
| Fiber (lbs.) | 0 | 3 | 1.5 | 0 | 1.5 | 0 |
| Surface-Treated HPMC (lbs.) | 0 | 0 | 0 | 0 | 0 | 0.5-1 |

Table 2 shows an alternate formulation of the hydroseeding mixes.

TABLE 2 for 50 pound bags.

| | Example # | | |
|---|---|---|---|
| | 1 | 2 | 3 |
| Solids from digester Pounds | 25 | 23.5 | 26.5 |
| Cover Composition Optionally from digester Pounds | 25 | 23.5 | 22.0 |
| Fiber Pounds | 0 | 3 | 1.5 |

In some embodiments, the invention relates to a hydroseeding slurry. This slurry contains a hydroseeding substrate described supra, water, seed, and optionally one or more fertilizer and at least one soil adjuvant. According to aspects of the invention, the water used may be any source of water that is readily available and that would not be harmful to the seed or impermissible due to regulations related to groundwater contamination. As an example, untreated pond water or water that contains amounts of contaminants that would make it unsuitable as drinking water could be used as the source of the liquid.

The amount of water added to the hydroseeding substrate, and the seed may be adjusted to accommodate the soil surface and the vegetation to be grown. For instance, a steeper slope may require the addition of less water to the hydroseeding substrate to provide a thicker slurry, while more water may be added in those situations where the soil is dryer or where the vegetation to be grown requires more liquid. In some embodiments, between 70 gallons and 100 gallons of water are added to 50 pounds of hydroseeding substrate. In some embodiments, between 80 gallons and 100 gallons of water are added to 50 pounds of hydroseeding substrate. In some embodiments, 80 gallons of water are added to 50 pounds of hydroseeding substrate.

Soil adjuvants, for purposes of this application, include any additive that may aid in the growth of the desired vegetation. Such adjuvants include, but are not limited to, additives which may adjust the pH of the growing medium (i.e., the soil and/or the hydroseeding substrate or slurry), additional fertilizers, or other nutrients. Additional adjuvants that may be added to change the viscosity or strength of the slurry, or to improve resistance to rain before cure, include cellulosic polymers (for example, Xtreme Rain Shield®, LSC Environmental Products, LLC, Apalachin, N.Y.) additional fibers, or cement.

The combination of mulch and the cover composition disclosed herein overcomes many of the challenges found in prior art hydroseeding mixtures. The disclosed hydroseeding substrate is softer, and thus easier to separate than traditional brick-like hydroseed products. Further, traditional hydroseed products tend to harden, while the hydroseeding slurry disclosed herein remains in a more liquid-like form. In some embodiments, the consistency of the hydroseeding slurry is of pudding. This consistency of the hydroseeding slurry not only prevents the clogging of hydroseeding machinery and equipment that one finds when using traditional hydroseeding products, but even allows the hoses and pumps being used to be lubricated. Further, the reliability of the consistency of the hydroseeding slurry results in a quicker, easier application process.

Typical hydroseeding equipment is either jet agitated hydro seeders or mechanical agitated hydro seeders.

Still further, it is found that inclusion of the surface treated HPMC in embodiments of the invention leads to improved performance in rain durability, even before the hydroseeding slurry has dried. Thus, inventive embodiments also show extremely durable resistance to rain erosion even when wet.

Another application for the use of primary solids from anaerobic digesters is as a replacement for Peat Moss when planting. Currently the use of Peat Moss as a soil conditioner and nutrient is losing popularity. The reasons for this are many but its extraction for human use dries the peat causing the area to degrade and increases the risk of wildfires. Mining peat releases large quantities of greenhouse gases and consumes a stored carbon' in the environment. These factors allow for increasing amounts of carbon dioxide to be released into the atmosphere, making peat moss mining and use a very large source of greenhouse gases. The United Kingdom has banned the use of Peat Moss at the household level. Certain parties have described peat mining as 'environmentally bereft' and use of peat as 'Environmental vandalism'.

The amount of peat compost used for amateur gardens is estimated to be 3 billion liters per year with commercial extraction removing 500 years of accumulation over one yearly period. Due to the slow accumulation of peat, this current use of the resource is not considered a renewable resource and mining peat is considered unsustainable. Therefore, there is a need for a Peat Moss replacement. The primary solids from anaerobic digesters contain similar properties and are more nutrient-rich than Peat Moss. The primary solids from anaerobic digesters will retain water and provide nutrients as the Peat Moss decomposes as well as creating a soil conditioner that is beneficial to the plant root system. Nitrogen and carbon-rich materials such as the primary solids from anaerobic digesters are vital to providing the optimum conditions for plants to grow. The solids resulting from the digestion process have the nitrogen and carbon constituents needed to support a plant's growth.

Using the primary solids from anaerobic digesters is the easy part but simplifying the distribution and utilization is the key to successfully replacing Peat Moss. The process can use either all course solids, all fine solids, a mixture of course and fine solids. The mixture and the type of the digestate are determined by how much nutrient the mixer wants in the final product. In some instances, the mixer can add some of the liquid biproduct of the dewatering step to add additional nutrients to the mixture.

Peat Moss is usually distributed in bags or bails. The Peat Moss is removed from the bag or bail and placed in the bottom of the hole prior to placing the plant in the hole. The instant invention allows The shipment and use of primary solids from anaerobic digesters to be made simpler by placing the solids from anaerobic digesters in a dissolvable tube. The tube can be formed from a thin encapsulating film. That film needs to stay intact while holding the solids from anaerobic digesters. They also need to be able to dissolve quickly and completely in cold water. The material offering those properties is a polymer called polyvinyl alcohol (PVA).

In its simplest form, PVA is a straight, saturated carbon chain with an alcohol group on every other carbon. It is made by hydrolyzing acetate groups in polyvinyl acetate into alcohol groups. By leaving a few acetates in place, PVA makes highly water-soluble packaging material. A container made of the PVA film that are 85-90% hydrolyzed are fully soluble in cold water. Container films are usually a blend of polymer chain lengths, from 600 to 2,400 monomers, with the exact composition depending on the strength and solubility needs for a specific pod.

The instant invention forms a disposable fertilizer comprised of producing a dissolvable fertilizer package and fertilizer by:
 a. obtaining at least one digestate solid from an anaerobic digester and the at least one digestate has been dewatered in a dewatering step and the resulting water from said dewatering step forming a liquid biproduct;
 b. mixing the at least one digestate solids from the anaerobic digester with nutrients to form a uniformly mixed mixture;
 c. drying said mixture;
 d. placing said mixture in a polyvinyl alcohol film and the polyvinyl alcohol film and the polyvinyl alcohol film is 85-90% hydrolyzed;
 e. sealing the ends of the polyvinyl alcohol film to create a tube.

Alternatively, the polyvinyl alcohol film can be formed into a tube and the fertilizer mix inserted into the polyvinyl alcohol film.
 n. The instant invention can further be described as a at least one digestate solid from an anaerobic digester and the at least one digestate has been dewatered in a dewatering step and the water collected in the dewatering step forming a liquid biproduct and the dewatered at least one digestate solid forms a dewater solid;
 o. mixing the at least one digestate solid from the anaerobic digester with nutrients to form a uniformly mixed mixture;
 p. adding a water-based liquid to the mixture of nutrients and the at least one digestate solid from anaerobic digester thereby forming a hydroseeding mixture capable of being dispensed with hydroseeding equipment; and
 q. spraying the hydroseeding mixture on to a parcel of soil.

The first preferred system for producing the hydroseeding mixture of the instant invention wherein the at least one primary solid is selected from the group consisting of fine digestate, course digestate, course and fine mixture of digestate.

The first preferred system for producing the hydroseeding mixture of the instant invention wherein the course digestate range for hydroseeding the mixture is selected from 50% by volume of course digestate to 95% by volume of the course digestate and the fine digestate for hydroseeding the mixture is selected from 5% by volume of course digestate to 50% by volume of the fine digestate.

The first preferred system for producing the hydroseeding mixture of the instant invention wherein the water-based liquid is selected from 0% by volume of liquid biproduct of the dewatering step to 15% by volume of the liquid biproduct of the dewatering step and the makeup water portion is selected from 85% of the water-based liquid to 100% of the water-based liquid.

The first preferred system for producing the hydroseeding mixture of the instant invention wherein the nutrients are selected from the group consisting of nitrogen, phosphorus and potassium carbon, calcium, magnesium, sulfur, iron, manganese, copper, zinc boron, sulfur, iron, and pesticides.

The first preferred system for producing the hydroseeding mixture of the instant invention wherein the hydroseeding equipment is selected from the group consisting of jet agitated hydro seeders and mechanical agitated hydro seeders.

The instant invention can further be described as a method of producing a dissolvable fertilizer container and fertilizer comprising:

a. at least one digestate solid from an anaerobic digester and the at least one digestate has been dewatered;
b. mixing said at least one digestate solid from said anaerobic digester with nutrients to form a uniformly mixed mixture;
c. drying said mixture;
d. placing said mixture in a polyvinyl alcohol film and said polyvinyl alcohol film and said polyvinyl alcohol film is 85-90% hydrolyzed;
e. sealing the ends of the polyvinyl alcohol film to create a tube.

The instant invention can further be described as a system for producing a dissolvable fertilizer container and fertilizer wherein said at least one digestate solid is extracted from anaerobic digester and the at least one digestate has been dewatered.

The instant invention can further be described as a system for producing a dissolvable fertilizer container and fertilizer wherein said at least one digestate solid is extracted from an anaerobic digestate and the at least one digestate has been dewatered.

The instant invention can further be described as a system for producing a dissolvable fertilizer container and fertilizer wherein said nutrient are selected from the group consisting of nitrogen, phosphorus and potassium carbon, calcium, magnesium, sulfur, sulfur, iron, manganese, copper, zinc boron, sulfur, iron, and pesticides.

The instant invention can further be described as an alternative hydroseeding substrate comprising:
a. primary solids from an anaerobic digester;
b. a cover composition comprising bentonite clay and a water-dispersible polymer or starch; and
c. a surface-treated hydroxypropyl methyl cellulose (HPMC).

The alternative hydroseeding substrate wherein the primary solids from the anaerobic digester comprise fibrous solids from dairy, poultry, hog, or cattle waste.

The alternative hydroseeding substrate wherein the water-dispersible polymer comprises one or more of methylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose, and carboxymethyl cellulose.

The alternative hydroseeding substrate wherein the surface-treated hydroxypropyl methyl cellulose (HPMC) is present in an amount of 0.1 to 20 weight percent of the substrate.

The alternative hydroseeding substrate wherein the surface-treated hydroxypropyl methyl cellulose (HPMC) is present in an amount of 1 to 4 weight percent of the substrate.

The alternative hydroseeding substrate further comprising a fertilizer.

The alternative hydroseeding substrate of the instant invention, further comprising a soil adjuvant.

The instant invention can further be described as a method of producing an alternative dissolvable fertilizer package, comprising:
a. obtaining at least one digestate solid from an anaerobic digester and dewatering the at least one digestate and said water forming a liquid biproduct;
b. mixing the at least one digestate solid with nutrients to form a uniformly mixed mixture;
c. drying said mixture;
d. placing said mixture in a polyvinyl alcohol film, wherein the polyvinyl alcohol film is 85-90% hydrolyzed; and
e. sealing the ends of the polyvinyl alcohol film to create a tube.

The instant invention can further be described as a method of producing an alternative dissolvable fertilizer package, wherein the nutrients comprise one or more of nitrogen, phosphorus, potassium, carbon, calcium, magnesium, sulfur, iron, manganese, copper, zinc, and boron.

The instant invention can further be described as a method of producing an alternative dissolvable fertilizer package, further comprising forming the polyvinyl alcohol film into a tube prior to placing the mixture inside.

The instant invention can further be described as a method of producing an alternative dissolvable fertilizer package, wherein the at least one digestate solid from the anaerobic digester that has been dewatered in a dewatering step and the water collected in the dewatering step thereby forming a liquid biproduct and the at least one digestate solid comprises fibrous solids from dairy, poultry, hog, or cattle waste.

The instant invention can further be described as a method of producing an alternative dissolvable fertilizer package, further comprising adding a pesticide to the mixture.

The instant invention can further be described as a method of producing an alternative dissolvable fertilizer package, wherein the nutrients comprise nitrogen, phosphorus, and potassium.

The instant invention can further be described as a method of producing an alternative dissolvable fertilizer package, further comprising adding a soil adjuvant to the mixture.

The instant invention can further be described as a second alternative dissolvable fertilizer package comprising:
a. a dried mixture of at least one primary digestate solid from an anaerobic digester and nutrients; and
b. a tube formed from a polyvinyl alcohol film that is 85-90% hydrolyzed, wherein the dried mixture is contained within the tube.

The instant invention can further be described as a dissolvable fertilizer package wherein the at least one digestate solid from an anaerobic digester that has been dewatered in a dewatering step and the water collected in the dewatering step forming a liquid biproduct and the at least one digestate solid comprises fibrous solids from dairy, poultry, hog, or cattle waste.

The dewatering step is a process that removes water from digestate to concentrate it and reduce its volume. Dewatering can be done using low pressure evaporation, Hydrothermal processes, mechanical methods or membrane technology.

The mechanical methods of dewatering can include but are not limited to screw press, Multi-Disk Screw Press MDQ, Multi-Roller Disk Press JD, Multi-Disk Sludge Thickener Esmil MDQ-T, Containerized sludge dewatering systems Esmil Module-D, Membrane-based filtrate treatment systems.

The instant invention can further be described as a dissolvable fertilizer package wherein the nutrients comprise one or more of nitrogen, phosphorus, potassium, carbon, calcium, magnesium, sulfur, iron, manganese, copper, zinc, and boron.

The instant invention can further be described as a dissolvable fertilizer package, wherein the nutrients comprise nitrogen, phosphorus, and potassium.

The instant invention can further be described as a dissolvable fertilizer package, further comprising a pesticide mixed with the dried mixture.

The dissolvable fertilizer package of the instant invention, further comprising a soil adjuvant mixed with the dried mixture.

The container can also be formed so they contain the other nutrients that are needed for the plant to grow and flourish. These other materials include nitrogen (N), phosphorus (P) and potassium (K). Together they make up the trio known as NPK. The container can also contain some carbon calcium, magnesium, sulfur, iron, manganese, copper, zinc boron, sulfur, iron, and pesticides to ensure that the plant remains healthy. The typical pesticide used in hydroseeding is Tenacity®.

The PVA film is extruded and formed into the appropriate shape. The primary solids from anaerobic digesters are then loaded into the container. Separate containers can be formed to hold the other materials and chemicals and bonded together to form a single deployable container.

To use the product the user digs the hole and places the container in the hole. The user then opens the container and spreads the material around the hole. The container will dissolve once the water is applied and thereby eliminate any trace of the container. This planting pod system makes the deployment of the solids from anaerobic digesters and associated nutrients easy to use and eliminates the problems associated with Peat Moss.

In a third preferred system for producing a hydroseeding mixture comprising:
- r. at least one digestate solid from an anaerobic digester and the at least one digestate has been dewatered in a dewatering step and the water collected in the dewatering step forming a liquid biproduct and the dewatered at least one digestate solid forms a dewater solid;
- s. mixing the at least one digestate solid from the anaerobic digester with nutrients and seeds to form a uniformly mixed mixture;
- t. adding a water-based liquid to the mixture of nutrients and the at least one digestate solid from anaerobic digester thereby forming a hydroseeding mixture capable of being dispensed with hydroseeding equipment; and
- u. spraying the hydroseeding mixture on to a parcel of soil.

The third preferred system for producing the hydroseeding mixture of the instant invention wherein the at least one primary solid is selected from the group consisting of fine digestate, course digestate, course and fine mixture of digestate.

The third preferred system for producing the hydroseeding mixture of the instant invention wherein the course digestate range for hydroseeding the mixture is selected from 50% by volume of course digestate to 95% by volume of the course digestate and the fine digestate for hydroseeding the mixture is selected from 5% by volume of course digestate to 50% by volume of the fine digestate.

The third preferred system for producing the hydroseeding mixture of the instant invention wherein the water-based liquid is selected from 0% by volume of liquid biproduct of the dewatering step to 15% by volume of the liquid biproduct of the dewatering step and the makeup water portion is selected from 85% of the water-based liquid to 100% of the water-based liquid.

The third preferred system for producing the hydroseeding mixture of the instant invention wherein the nutrients are selected from the group consisting of nitrogen, phosphorus and potassium carbon, calcium, magnesium, sulfur, iron, manganese, copper, zinc boron, sulfur, iron, and pesticides.

The third preferred system for producing the hydroseeding mixture of the instant invention wherein the hydroseeding equipment is selected from the group consisting of jet agitated hydro seeders and mechanical agitated hydro seeders.

A fourth preferred method of producing a dissolvable fertilizer container and fertilizer comprising:
- v. at least one digestate solid from an anaerobic digester that has been dewatered in a dewatering step and the water collected in the dewatering step forming a liquid biproduct and the dewatered at least one digestate solid forms a dewater solid;
- w. mixing the at least one digestate solids from the anaerobic digester with nutrients to form a uniformly mixed mixture;
- x. drying the mixture of at least one digestate solids from the anaerobic digester with nutrients;
- y. placing the mixture in a polyvinyl alcohol film and the polyvinyl alcohol film and the polyvinyl alcohol film is 85-90% hydrolyzed;
- z. sealing the ends of the polyvinyl alcohol film to create a tube with sealed ends.

The fourth preferred method for producing the dissolvable fertilizer container and fertilizer of the instant invention wherein the dewater solid is selected from the group consisting of dewatered fine digestate, course digestate, course and fine mixture of digestate.

The fourth preferred method for producing the dissolvable fertilizer container and fertilizer of the instant invention wherein the at least one primary solid is selected from the group consisting of fine digestate, course digestate, course and fine mixture of digestate.

The fourth preferred method for producing a dissolvable fertilizer container and fertilizer of the instant invention wherein the nutrient are selected from the group consisting of nitrogen, phosphorus and potassium carbon, calcium, magnesium, sulfur, iron, manganese, copper, zinc boron, sulfur, iron, and pesticides.

A fifth preferred hydroseeding substrate of the instant invention comprising:
- aa. a primary solid consisting of at least one digestate solid from an anaerobic digester that has been dewatered in a dewatering step and the water collected in the dewatering step forming a liquid biproduct and the dewatered at least one digestate solid forms a dewater solid;
- bb. a cover composition comprising bentonite clay and a water-dispersible polymer or starch;
- cc. a surface-treated hydroxypropyl methyl cellulose (HPMC) and seeds; and
- dd. a water-based liquid comprising water and the liquid biproduct.

The fifth preferred hydroseeding substrate of the instant invention, wherein the primary solids from the anaerobic digester comprise fibrous solids from dairy, poultry, hog, or cattle waste.

The fifth preferred hydroseeding substrate of the instant invention, wherein the water-dispersible polymer comprises one or more of methylcellulose, ethyl methyl cellulose, hydroxyethyl cellulose, hydroxypropyl cellulose, hydroxyethyl methyl cellulose, hydroxypropyl methyl cellulose, ethyl hydroxyethyl cellulose, and carboxymethyl cellulose.

The fifth preferred hydroseeding substrate of the instant invention, wherein the surface-treated hydroxypropyl methyl cellulose (HPMC) is present in an amount of 0.1 to 20 weight percent of the substrate.

The fifth preferred hydroseeding substrate of the instant invention1, wherein the surface-treated hydroxypropyl methyl cellulose (HPMC) is present in an amount of 1 to 4 weight percent of the substrate.

The fifth preferred hydroseeding substrate of the instant invention1, further comprising a fertilizer.

The fifth preferred hydroseeding substrate of the instant invention, further comprising a soil adjuvant.

A sixth preferred method of producing a dissolvable fertilizer package, comprising:
f. obtaining at least one digestate solid from an anaerobic digester that has been dewatered in a dewatering step and the water collected in the dewatering step forming a liquid biproduct and the dewatered at least one digestate solid forms a dewater solid;
g. mixing the at least one digestate solid with nutrients to form a uniformly mixed mixture;
h. drying the mixture;
i. placing the mixture in a polyvinyl alcohol film, wherein the polyvinyl alcohol film is 85-90% hydrolyzed; and
j. sealing the ends of the polyvinyl alcohol film to create a tube.

The sixth preferred method of the instant invention, wherein the nutrients comprise one or more of nitrogen, phosphorus, potassium, carbon, calcium, magnesium, sulfur, iron, manganese, copper, zinc, and boron.

The sixth preferred method of the instant invention, further comprising forming the polyvinyl alcohol film into a tube prior to placing the mixture inside.

A seventh preferred method of producing a dissolvable fertilizer package, comprising:
a. obtaining at least one digestate solid from an anaerobic digester that has been dewatered in a dewatering step and the water collected in the dewatering step forming a liquid biproduct and the dewatered at least one digestate solid forms a dewater solid;
b. mixing the at least one digestate solid with nutrients to form a uniformly mixed mixture;
c. drying said mixture;
d. placing said mixture in a polyvinyl alcohol film, wherein the polyvinyl alcohol film is 85-90% hydrolyzed; and
e. sealing the ends of the polyvinyl alcohol film to create a tube.

The seventh preferred method, wherein the nutrients comprise one or more of nitrogen, phosphorus, potassium, carbon, calcium, magnesium, sulfur, iron, manganese, copper, zinc, and boron.

The seventh preferred method, further comprising forming the polyvinyl alcohol film into a tube prior to placing the mixture inside.

Referring now to the drawings FIGS. 1-7, and more particularly to FIG. 1, there is shown an extrusion and filling process for making a dissolvable tube container and filling them with the primary solids from anaerobic digesters 105. The extruder 110 extrudes a PVA film 120 and it is captured in rollers 130. Rollers 130 transfers the PVA film 120 to the former 150 where solids from anaerobic digesters 105 are placed in the hopper 140 and loaded into the PVA film 120 and former 150 forms tube 160 comprising of PVA film 120 encapsulating solids from anaerobic digesters 105. Chopper 170 then cuts and seals tube 160 into tubes 180. Prior to placing the solids from anaerobic digesters 105 in the hopper 140 the solids from anaerobic digesters 105 can be dried in either an oven or by vacuum drying. However, any form of drying mechanism can be used.

Figure 2:
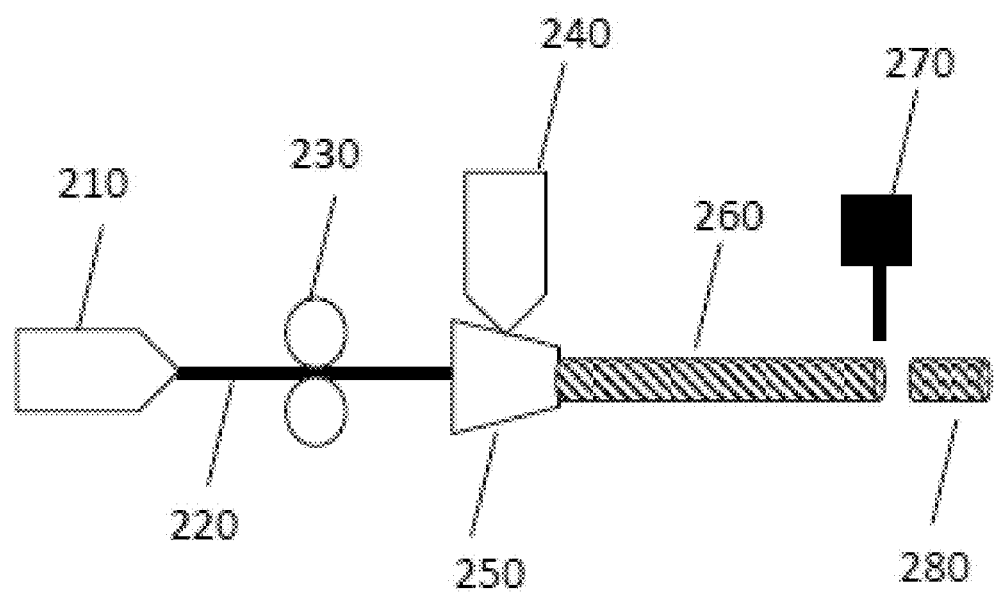
FIG. 2 is an elevation view showing a system for making a dissolvable tube container and filling them with nutrients and other materials that are used to fertilize a plant.

Referring to FIG. 2 shows a system for making a dissolvable tube container and filling them with nutrients and other materials that are used to fertilize a plant. The extruder 210 extrudes a PVA film 220 and it is captured in rollers 230. Rollers 230 transfers the PVA film 220 to former 250 where nutrients are placed in hopper 240 and the nutrients are loaded into the PVA film 220 and former 250 forms tube 260 comprising of PVA film 220 encapsulating the nutrients. Chopper 270 then cut and seals tube 260 into tubes 280. The nutrients can be selected from the group that includes nitrogen (N), phosphorus (P) and potassium (K). Together they make up the trio known as NPK. The nutrients can also contain some carbon, calcium, magnesium, sulfur, iron, manganese, copper, zinc boron, sulfur, iron, and pesticides to ensure that the plant remains healthy. The typical pesticide used in hydroseeding is Tenacity®.

Figure 3:
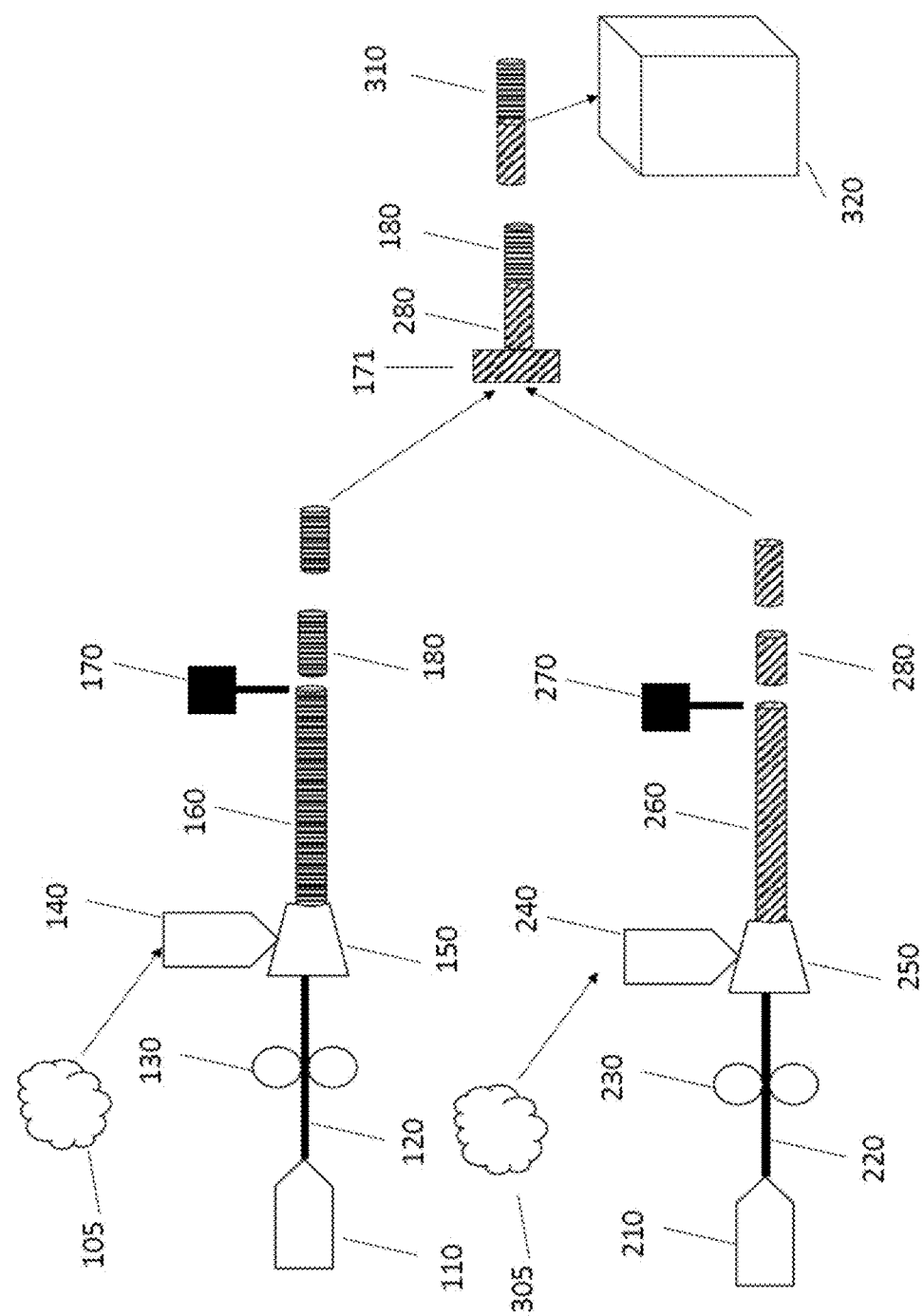
FIG. 3 is an elevation view showing a system for making a product comprised of nutrients and other materials and solids from anaerobic digesters.

Referring to FIG. 3 shows a system for making a product comprised of tubes 280 and tubes 180.

The extruder 210 extrudes a PVA film 220 and it is captured in rollers 230. Rollers 230 transfers the PVA film 220 to former 250 where nutrients are placed in hopper 240 and the nutrients 305 are loaded into the PVA film 220 and former 250 forms tube 260 comprising of PVA film 220 encapsulating the nutrients. Chopper 270 then cut and seals tube 260 into tubes 280.

The extruder 110 extrudes a PVA film 120 and it is captured in rollers 130. Rollers 130 transfers the PVA film 120 to former 150 where solids from anaerobic digesters 105 are placed in the hopper 140 and loaded into the PVA film 120 and former 150 forms tube 160 comprising of PVA film 120 encapsulating solids from anaerobic digesters 105. Chopper 170 then cuts and seals tube 160 into tubes 180.

The tubes 180 and tubes 280 are joined using merger 171 to form product 310 and are placed in package 320 for shipping.

Prior to placing the solids from anaerobic digesters 105 in the hopper 140 the solids from anaerobic digesters 105 can be dried in either an oven or by vacuum drying. However, any form of drying mechanism can be used.

Figure 4:
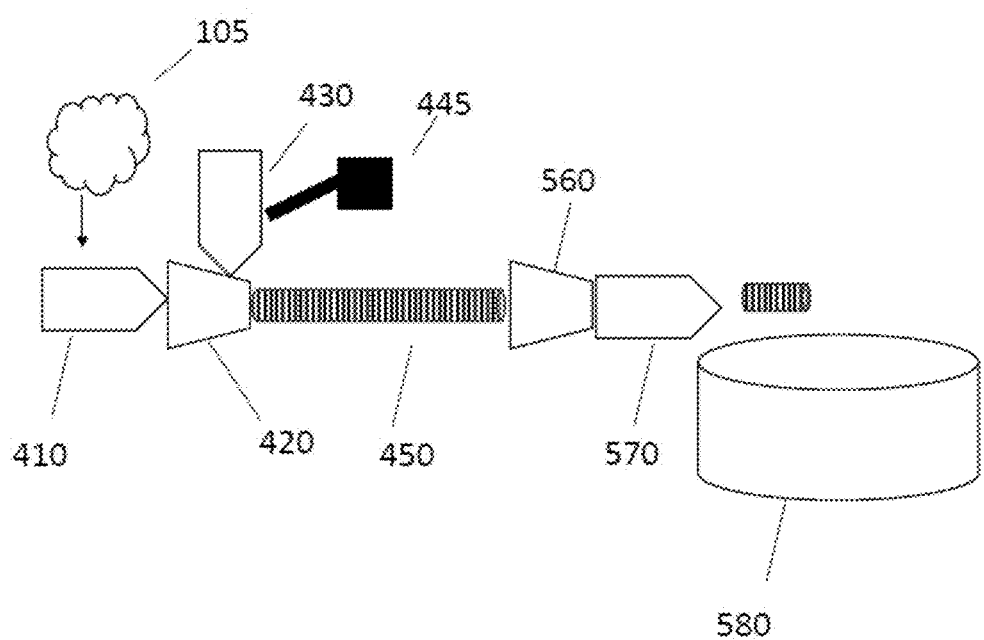
FIG. 4 is shown a system for producing a hydroseeding mixture comprising of solids from anaerobic digesters.

Referring to FIG. 4, there is shown a system for producing a hydroseeding mixture comprising of solids from anaerobic digesters 105 and feeding it into a mixer 410. The mixed solids from anaerobic digesters 105 exiting mixer 410 and enters mixer 420 where nutrients and optional seeds 445 are added in by injector 430. The product can be provided to the user with or without seeds so the user can decide what is the best seed to use for a particular project therefore the seeds are optional. Prior to placing the solids from anaerobic digesters 105 in the hopper 140 the solids from anaerobic digesters 105 can optionally be dried in by any suitable means including but not limited to an oven or by vacuum drying. However, any form of drying mechanism could be used.

The mixed composite material 450 formed by mixer 420 from solids from anaerobic digesters 105, optional seeds 445, and nutrients forms mixed composite material 450 and packager 560 than applies packaging and sealer 570 seals the package and deposits it in bin 580.

Figure 5:
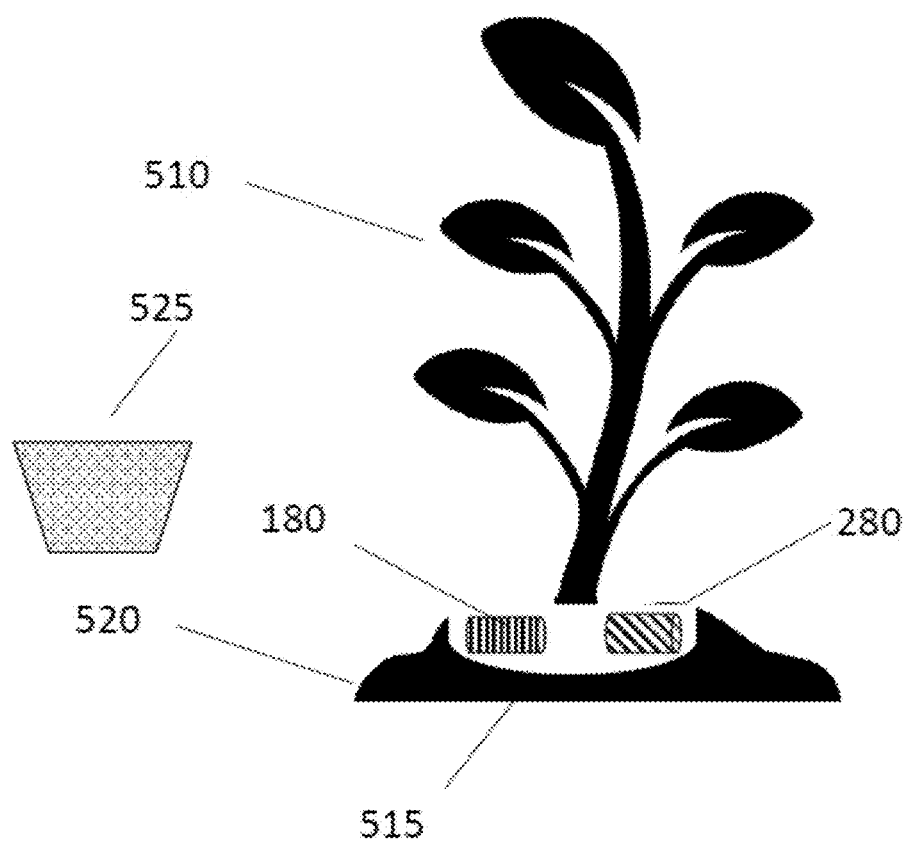
FIG. 5 is shown a plant planted in a hole and the hole is in soil 520. The user plants the plant and places the tube containing solids from anaerobic digesters and nutrients into the hole.

Referring to FIG. 5, there is shown a plant 510 planted in hole 515 and the hole 515 is in soil 520. The user plants the plant 510 and places tube 180 containing solids from anaerobic digesters and tube 280 with nutrients into hole 515. When the plant is watered the water dissolves the outer covering of the tube and releases the solids from anaerobic digesters and the nutrients into the hole 515.

Figure 6:
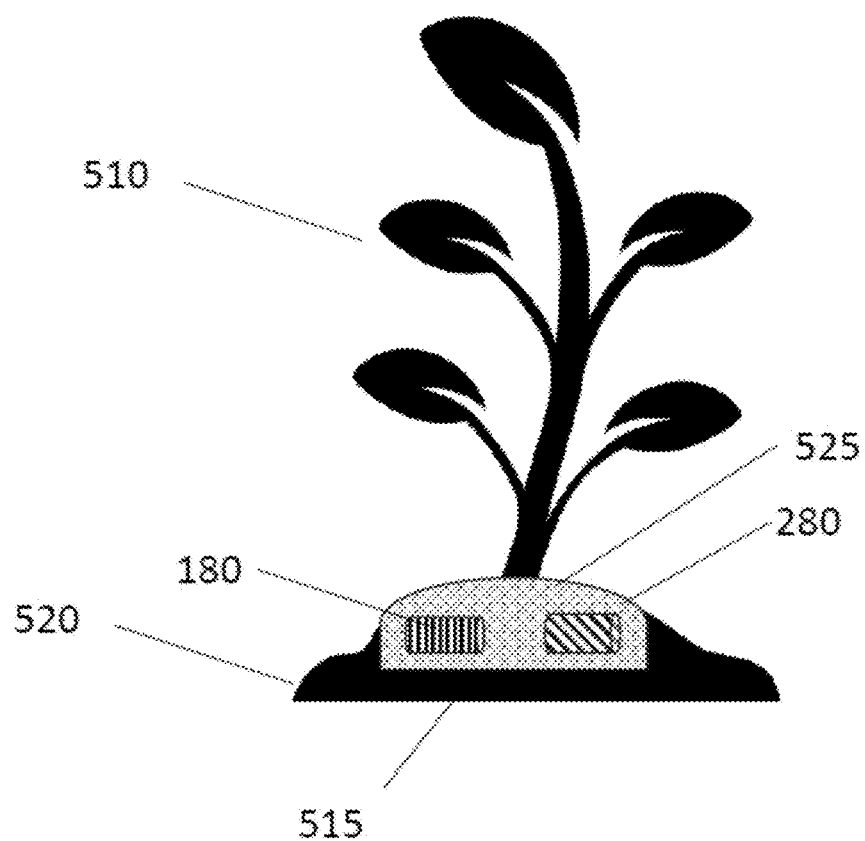
FIG. 6, there is shown the plant of FIG. 5 plant planted in hole and the hole is in soil.

Referring to FIG. 6, there is shown the plant of FIG. 5 plant 510 planted in hole 515 and the hole 515 is in soil 520. The user plants the plant 510 and placed tube 180 containing solids from anaerobic digesters and tube 280 with nutrients into hole 515. The user then places cover soil 525 over the tubes 180 and tube 280 and the roots of plant 510. The user then waters the plant 510 and the water breaks down the PVA tube material exposing plant 510 to the nutrients in tube 280 and the solids from anaerobic digesters in tube 180. When the plant is watered the water dissolves the outer covering of the tube and releases the solids from anaerobic digesters and the nutrients into the hole 515. Alternatively, the tube 180 can contain both solids from anaerobic digesters and nutrients in one package.

Figure 7:
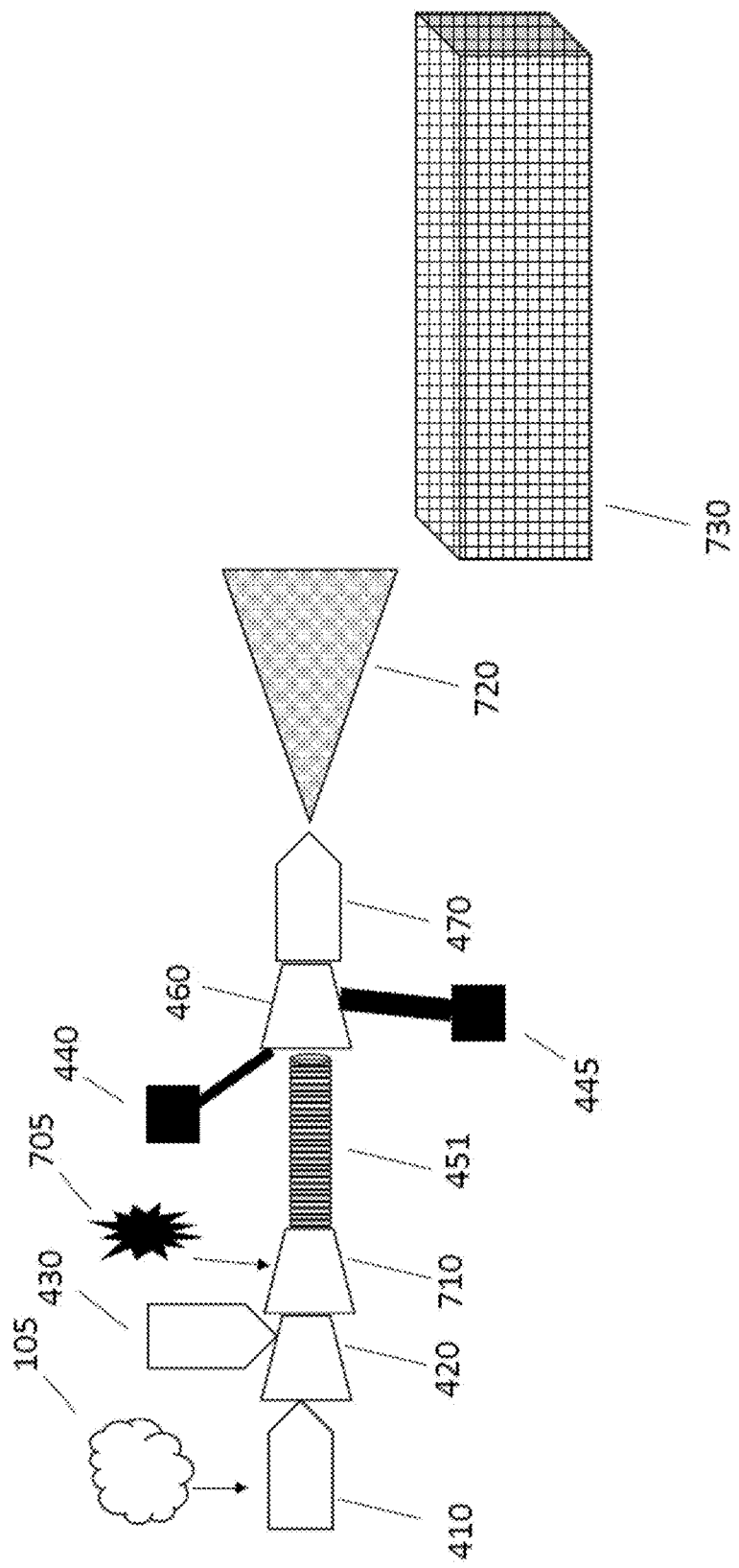
FIG. 7 is shown a system for producing a hydroseeding mixture comprising of solids from anaerobic digesters and applying it to a parcel of soil.

Referring to FIG. 7, there is shown a system for producing a hydroseeding mixture comprising of solids from anaerobic digesters 105 and feeding it into a mixer 410. The mixed solids from anaerobic digesters 105 exiting mixer 410 and enters mixer 420 where nutrients are added in by injector 430. The composite material of solids from anaerobic digesters 105 and nutrients enters mixer 710 where water-dispersible polymer 705 is added to form composite material 451. The seed 445 is added in to mixer 460 to the composite material 451. The water supply 440 adds water to mixer 460 and the nozzle or hydroseeding machine 470 sprays the hydroseeding mixture 700 on to parcel of soil 730. The water can also be the liquid biproduct from the dewatering step of the at least one digestate where the at least one digestate is dewatered in a dewatering step or it can be a mixture of liquid biproduct and water.

Prior to placing the solids from anaerobic digesters 105 in the hopper 140 the solids from anaerobic digesters 105 can optionally be dried in by any suitable means including but not limited to an oven or by vacuum drying. However, any form of drying mechanism could be used.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

Although very narrow claims are presented herein, it should be recognized that the scope of this invention is much broader than presented by the claim. It is intended that broader claims will be submitted in an application that claims the benefit of priority from this application.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A method of producing a dissolvable soil conditioner container and soil conditioner, the method comprising the steps of:
    dewatering at least one digestate solid from an anaerobic digester to form a liquid biproduct and a dewatered fiber digestate having a moisture content of 2 to 60% by weight;
    mixing said dewatered fiber digestate with at least one nutrient to form a uniformly mixed mixture of the dewatered fiber digestate and the at least one nutrient;
    drying said uniformly mixed mixture to form a dry uniformly mixed mixture that provides a soil conditioner;
    placing said dry uniformly mixed mixture in a polyvinyl alcohol film tube wherein said polyvinyl alcohol film is 85-90% hydrolyzed; and
    sealing the ends of the polyvinyl alcohol film tube to create a tube with sealed ends.

2. The method of claim 1 wherein said dewatered fiber digestate is selected from the group consisting of a mixture of dewatered coarse digestate and dewatered fine digestate, dewatered fine digestate, and dewatered coarse digestate.

3. The method of claim 2 wherein said dewatered fiber digestate is a mixture of dewatered coarse digestate and dewatered fine digestate.

4. The method of claim 1 wherein said at least one digestate solid is selected from the group consisting of a mixture of coarse digestate solid and fine digestate solid, fine digestate solid, and coarse digestate solid.

5. The method of claim 4 wherein said at least one digestate solid is a mixture of coarse digestate solid and fine digestate solid.

6. The method for producing the dissolvable soil conditioner container and soil conditioner of claim 1 wherein said at least one nutrient includes at least one nutrient selected from the group consisting of nitrogen, phosphorus, potassium, carbon, calcium, magnesium, sulfur, iron, manganese, copper, zinc, and boron.

7. The method of claim 1 wherein said step of mixing said dewatered fiber digestate with at least one nutrient further comprises mixing said dewatered fiber digestate and said at least one nutrient with at least one pesticide to form a uniformly mixed mixture of the dewatered fiber digestate, the at least one nutrient, and the at least one pesticide.

8. The method of claim 1 wherein said step of mixing said dewatered fiber digestate with at least one nutrient further comprises mixing said dewatered fiber digestate and said at least one nutrient with at least one soil adjuvant to form a uniformly mixed mixture of the dewatered fiber digestate, the at least one nutrient, and the at least one soil adjuvant.

* * * * *